United States Patent [19]
Veenendaal

[11] 3,782,227
[45] Jan. 1, 1974

[54] INSULATION-SLITTING AND STRIPPING MACHINE

[75] Inventor: Cornelis Teunis Veenendaal, Milwaukie, Oreg.

[73] Assignee: Tektronix, Inc., Beaverton, Oreg.

[22] Filed: July 6, 1971

[21] Appl. No.: 159,792

[52] U.S. Cl. .............................................. 81/9.51
[51] Int. Cl. ............................................. H02g 1/12
[58] Field of Search ........................ 81/9.51; 140/1; 7/14.1 R; 30/90.4, 90.6

[56] References Cited
UNITED STATES PATENTS
3,212,369  10/1965  Way ................................ 30/90.6 X
3,283,398  11/1966  Andren ........................... 81/9.51 X Primary Examiner—Granville Y. Custer, Jr.
Assistant Examiner—Roscoe V. Parker
Attorney—Adrian J. LaRue et al.

[57] ABSTRACT

An insulation-slitting and stripping machine is provided with slitting members adjacent feeding means to slit insulated-conductor means of an electrical cable means so that they are separated from each other as the feeding means feeds a predetermined length of electrical cable means therein. A splaying means is disposed adjacent the slitting members to space the separated free ends from one another. Insulation-stripping means is movable relative to the slit and splayed free insulated-conductors means to strip insulation from the insulated-conductors means and to cut them at predetermined lengths.

10 Claims, 10 Drawing Figures

INVENTOR
CORNELIS TEUNIS VEENENDAAL
BY
ATTORNEY

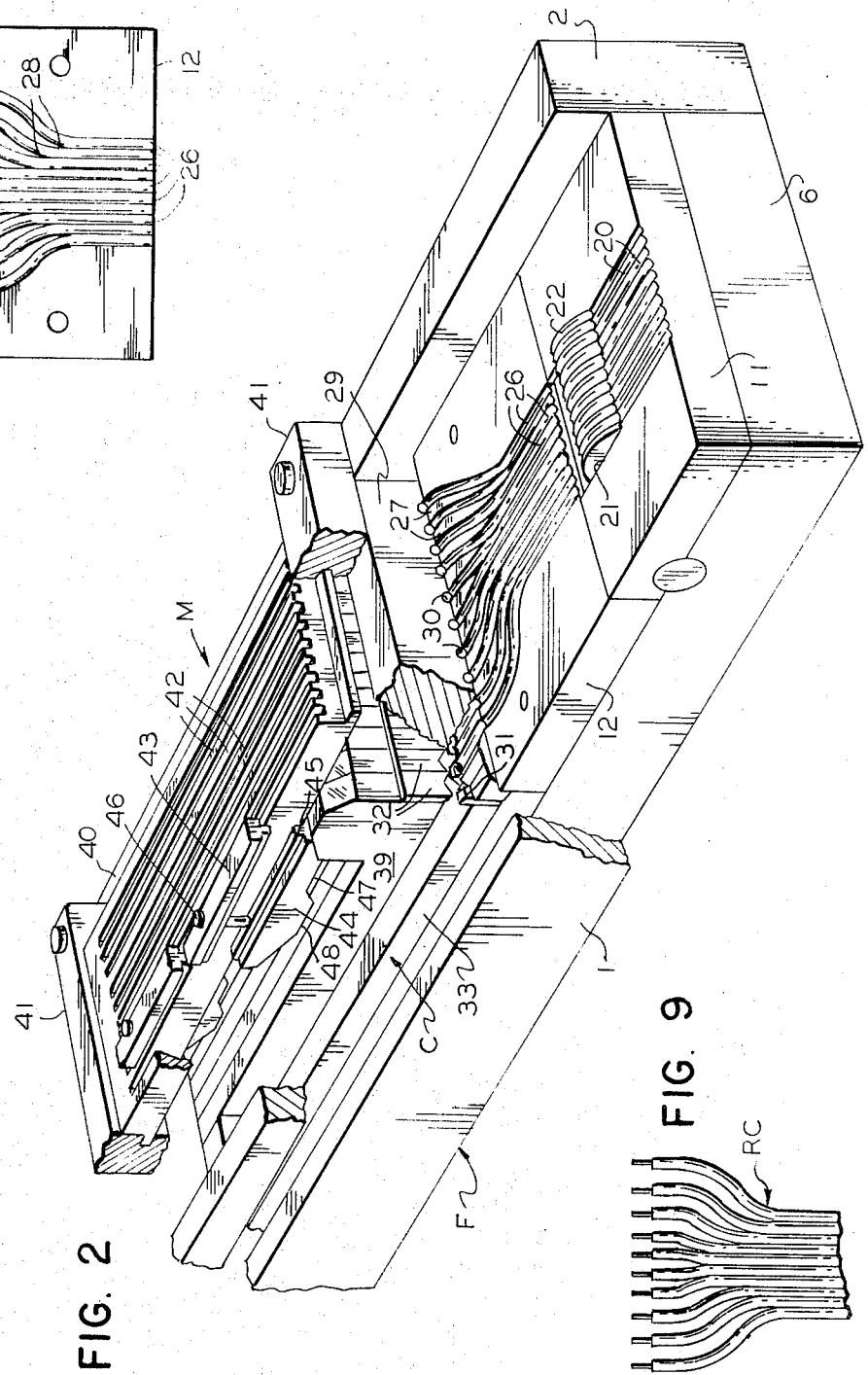

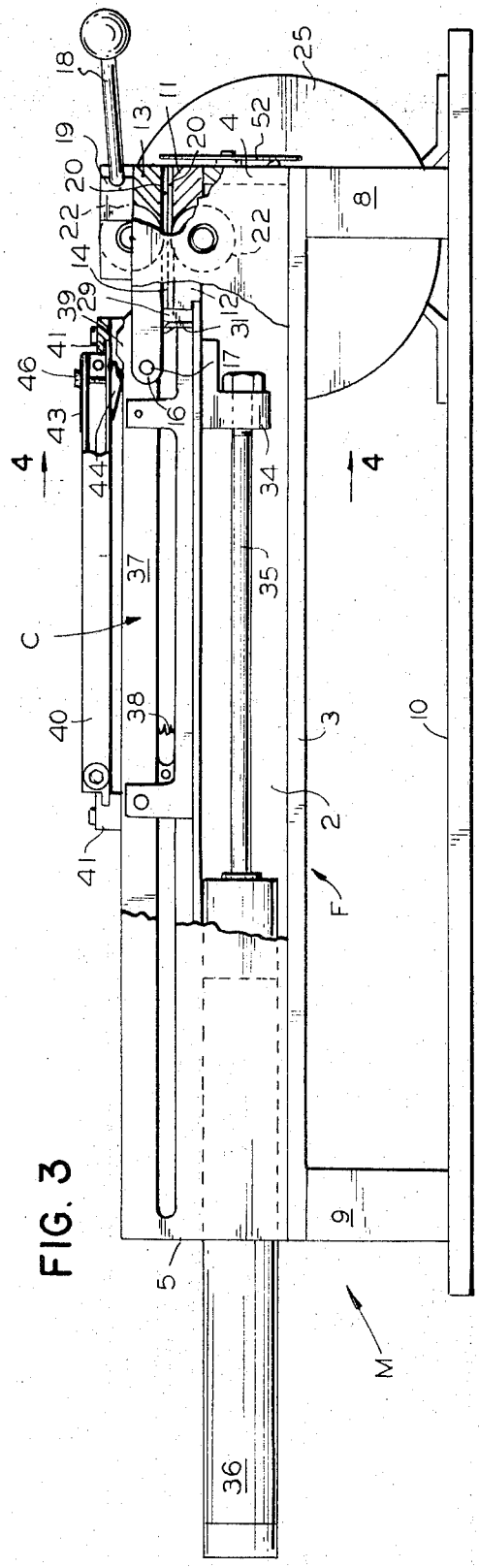
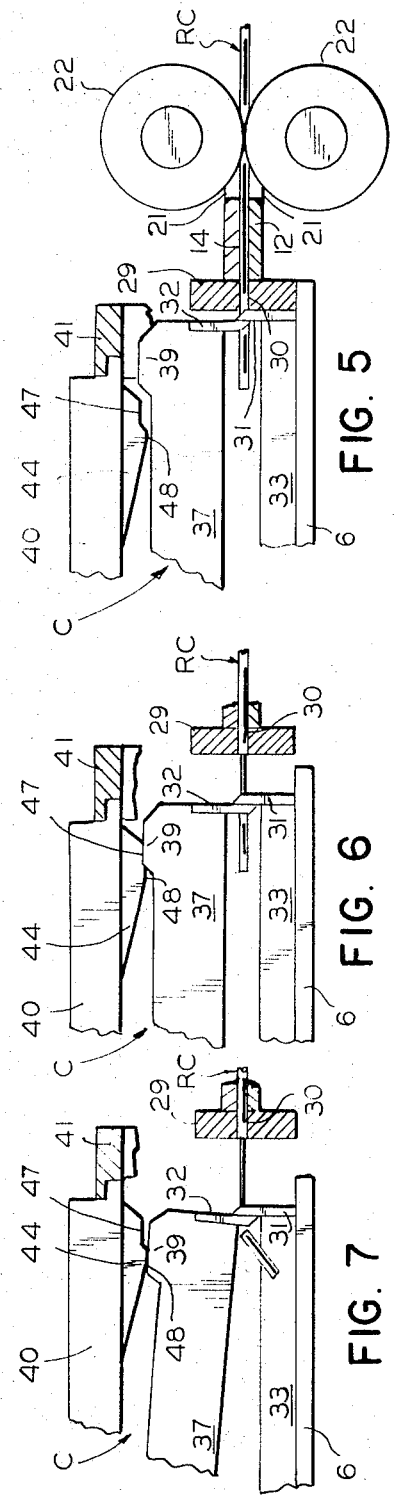

3,782,227

INSULATION-SLITTING AND STRIPPING MACHINE

BACKGROUND OF THE INVENTION

Electrical cables are made by adhering insulated electrical conductors together in a side-by-side manner thereby forming ribbon or flat electrical cables (hereinafter referred to as ribbon cables) that are flexible and contain from two to any number of insulated conductors. In order to use these ribbon cables, it is necessary to terminate their ends to apply electrical connectors thereon or to solder or attach the conductor ends to conductive paths of printed circuit boards. This can best be accomplished by slitting the insulated electrical conductors along their lines of juncture to provide separated electrical conductors at the free ends of the ribbon cables.

Heretofore, slitting the ribbon cables has been done by various ways, such as by workers using knives or as taught by U. S. Pat. No. 3,575,329, but since these prior ways are time consuming, the separated conductors were not spaced from one another, this made it difficult to strip insulation from the separated conductors and to provide different lengths of conductors having stripped ends.

The insulation-slitting and stripping machine of the present invention is useful to effectively and automatically slit electrical conductors at ends of ribbon or flat electrical cables so that the ends are preferably separated from each other so as to be free for movement relative to one another.

The insulation-slitting and stripping machine of the present invention is especially useful to splay the slit free ends of ribbon electrical cables so that they are disposed at spaced locations to conveniently facilitate subsequent stripping, cutting and termination operations.

The insulation-slitting and stripping machine of the present invention is capable of effectively and accurately stripping insulation from free and separated ends of insulated electrical conductors of ribbon electrical cable means to provide stripped and freely movable insulated conductors of varying or equal lengths at the ends of the ribbon cable means.

An object of the present invention is, therefore, to provide an insulation-slitting and stripping machine that will slit an end of the ribbon cable means to provide separate insulated conductor means that are freely movable relative to each other.

Another object of the invention is the provision of slitting and stripping machine that will automatically splay slit free ends of insulated-conductor means of a ribbon cable means to dispose the free ends in spaced relationship with respect to one another.

A further object of the invention is to provide insulation-stripping and cutting means on a slitting and stripping machine to strip insulation from slitted free ends of insulated-conductors means of ribbon cable means and provide stripped and freely movable insulated-conductor means of varying or equal lengths at the ends of the ribbon cable means.

Still another object of the invention is the provision of slitting a splaying die members for slitting insulation of ribbon cable means and splaying the slitted insulated electrical conductors thereof.

A still further object of the invention is the method of slitting, splaying, stripping and shearing insulated electrical conductors of ribbon cable means.

BRIEF DESCRIPTION OF THE DRAWINGS

Other objects and advantages of the present invention will become apparent to those skilled in the art from a reading of the following detailed description of the preferred embodiment when taken in conjunction with the accompanying drawings wherein:

FIG. 2 is a perspective view of the operating parts of the machine of FIG. 1 with parts broken away;

FIG. 2a is a top plan view of one half of a slitting and splaying die;

FIG. 3 is a side elevational view of FIG. 2 with parts broken away;

FIGS. 5–7 are part views of FIG. 3 illustrating the operation of the machine;

FIG. 9 is a plan view of a ribbon cable means that has been slit, splayed, stripped and sheared.

DESCRIPTION OF THE PREFERRED EMBODIMENT

Figure 1:
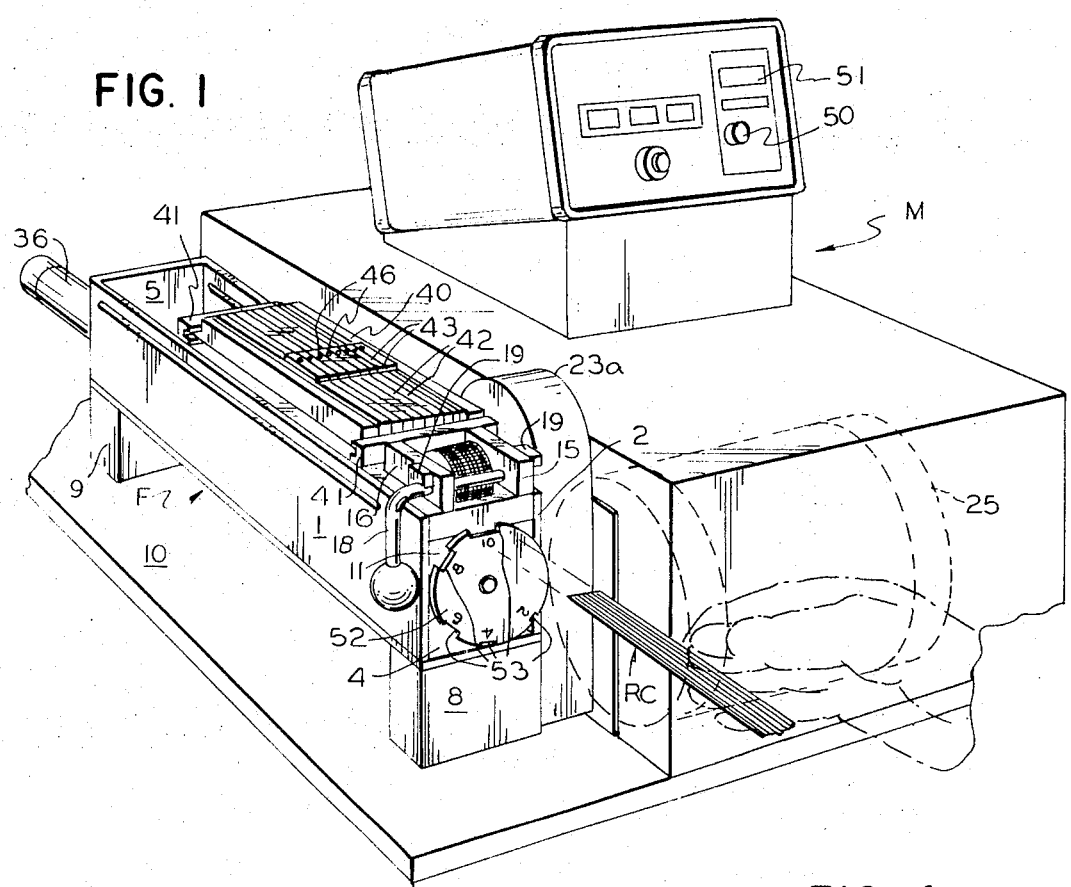
FIG. 1 is a perspective view of the insulation-slitting and stripping machine according to the present invention.

Turning now to the drawings, machine M has a frame F including side plates 1 and 2, a bottom plate 3, front plate 4 and rear plate 5. An intermediate plate 6 is disposed between side plates 1 and 2 and includes a slot 7 therealong. Frame F is mounted on blocks 8 and 9 which are in turn mounted on a plate 10.

Plates 11 and 12 are mounted on plate 6. Similar plates 13 and 14 are connected to plates 15 and 16 thereby forming a movable unit which in turn is pivotally connected to frame F via pivot 17 so that this unit can be moved relative to plates 11 and 12. A latching member 18 is pivotally mounted in plates 15 and 16 and it includes semi-circular areas (not shown) that mate with arcuate areas in projections 19 on frame F to latch the movable unit in position.

Plates 11 and 13 have parallel grooves 20 disposed therein which extend from the front of plates 11 and 13 to openings 21 in which serrated feed rollers 22 are disposed. Meshed gears 23 are connected to the axles of feed rollers 22 to drive same via shaft 24 and electric motor 25. A cover 23a (FIG. 1) covers gears 23 to protect same. Opposed grooves 20 when plates 11 and 13 are disposed opposite each other form a passage or channel for receiving an end of ribbon cable RC which comprises adjacent insulated electrical conductors adhered together via the insulation thereof. Feed rollers 22 upon being driven by gears 23, shaft 24 and motor 25 will feed an end of ribbon cable RC into a passage or channel formed in blocks 12 and 14 by grooves 26, which are shown only in FIGS. 2 and 2a. Grooves 26, from the front ends of blocks 12 and 14 to about midway thereof, are in alignment with grooves 20 in blocks 11 and 13 and then they curve outwardly from each side of a central axis so that grooves 26, from about midway of blocks 12 and 14 to the rear ends thereof, are separated by spacers 27 which are provided with sharp edges 28.

When blocks 12 and 14 are in engagement, the mating sharp edges 28 form cutting surfaces to slit the insulation along the areas that join the insulated electrical conductors together and the insulated electrical conductors are splayed outwardly by the outwardly-curved sections of grooves 26 thereby separating the conductors from each other a predetermined distance. The sharp edges 28 are positioned relative to the front ends of blocks 12 and 14 by virtue of the radius of curvature of the curved sections of grooves 26.

A guide block 29 is disposed between plates 1 and 2 adjacent rear ends of blocks 12 and 14 and it includes holes 30 in alignment with the outer ends of the curved sections of grooves 26 to guide the slit and splayed insulated electrical conductors between the triangular-shaped openings of stationary stripping and cutting member 31 and movable stripping and cutting members 32.

Stationary stripping and cutting member 31 comprises a single plate having a saw tooth configuration thereby defining the triangular-shaped openings of movable stripping and cutting members 32. Member 31 is affixed to a plate 33 of a movable carriage C. A projection 34 extends outwardly from plate 33 through slot 7 in intermediate plate 6. A rod 35 has one end connected to projection 34 and the other end of rod 35 is connected to a piston (not shown) in air cylinder 36 so that when air cylinder 36 is operated, carriage C is moved along plate 6 via rod 35 and projection 34.

Arms 37 have one end pivotally mounted on plate 33 and they are maintained in spaced relationship therewith by springs 38. The other ends of arms 37 have cam-engaging projections 39 which are provided with leading and following beveled surfaces. Stripping and cutting members 32 are mounted on the front surfaces of arms 37.

A cam-carrying member 40 has its ends disposed in slotted members 41 mounted on side plates 1 and 2. Slots 42 are located in member 40 and T-shaped members 43 are movably disposed therein. Cams 44 have projections 45 which extend into slots 42 to position cams 44 along member 40 and they are connected to members 43 via screws 46 so that cams 44 can be lockably positioned along member 40 thereby defining programmable cams.

Cams 44 have inclined front and rear surfaces so that the beveled front and rear surfaces of cam-engaging projections 39 can ride easily along cams 44 when carriage C is driven in either direction therealong. Cams 44 also have first surfaces 47 along which cam-engaging projections 39 move after the inclined front surfaces of cams 44 cause arms 40 to be moved toward plate 33 when carriage C is being driven from guide block 29 thereby causing stripping and cutting members 31 and 32 to cut through the insulation at the beginning of surfaces 47 and to strip the insulation of the insulated electrical conductors to bare the electrical conductors as cam-engaging projections move along surfaces 47 to the end thereof as shown in FIG. 6 whereupon the leading beveled surfaces of cam-engaging projections 39 engage intermediate inclined surfaces on cams 44 at the ends of surfaces 47.

Second surfaces 48 cause cam-engaging projections 39 to move stripping and cutting members 32 further along stripping and cutting members 31 thereby cutting off the ends of the insulated electrical conductors as carriage C is moved further away from guide block 29.

The overlapping triangular-shaped openings of stripping and cutting members 31 and 32 define diamond-shaped openings which act as guide means for guiding the separate insulated electrical conductors as carriage C moves therealong so that the conductors can be stripped and cut at selected lengths depending upon the positions that cams 44 have been positioned via members 43 and screw 46. Thus, all conductors can be stripped and cut to the same or random lengths as desired.

Several cam-carrying members 40 can be provided with each member having the cams 44 set at selected location thereby defining templates to provide cables with slitted, splayed and stripped insulated electrical conductors of any desired length.

Alternatively, a single member 40 can be used and the cams 44 can be positioned therealong by using sheet metal templates to be properly positioned on member 40. Each of these templates has openings therein at the desired locations that cams 44 are to be positioned along member 40 such that screw heads of screws 46 after being loosened are disposed within the template openings and the screws are tightened to lock the cams 44 at their selected positions.

Guide block 29 can, if desired, be connected to the front end of carriage C adjacent stripping and cutting members 31 and 32 to properly guide the conductors so that they can be stripped and cut to proper lengths. Holes 30 can be slightly inclined to place some bias on the conductors so that they can be stretched to proper length as carriage C moves to a stripping and cutting position while the feed rollers 22, after feeding the end of ribbon cable RC into the cutting and stripping area of machine M to the desired length, will maintain the cable in a stationary position during the stripping and cutting operations.

Figure 8:
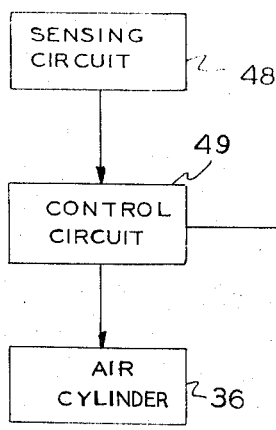
FIG. 8 is a block diagram illustrating the control means for controlling operation of the machine.
Figure 4:
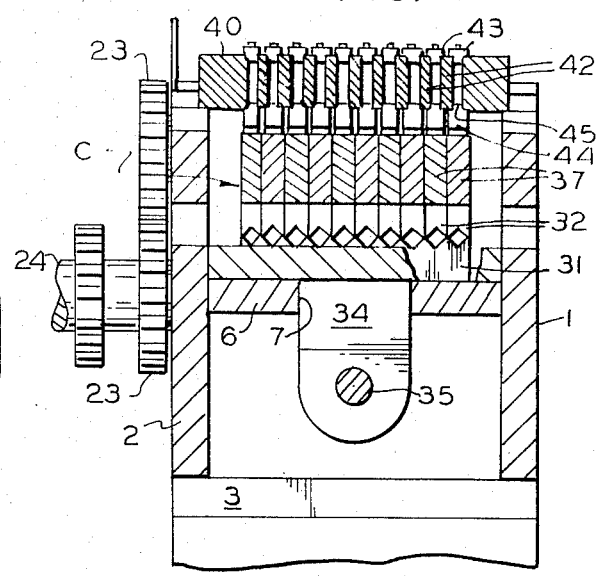
FIG. 4 is a view taken along lines 4—4 of FIG. 3.

FIG. 8 illustrates a block diagram of the sensing and control means for operating machine M. Sensing circuit 48 comprises a light-sensitive resistor (not shown) which is positioned in block 11 forward of feed roller 22 and a light source (not shown) is disposed in block 13 opposite the light-sensitive resistor to maintain control circuit inoperative so long as light impinges on the light-sensitive resistor. A microswitch can be used in place of the light-sensitive resistor and the light source.

As soon as the end of a ribbon cable RC passes between the light-sensitive resistor and the light source, control circuit 49 is operated via a relay or some similar means thereby operating feed motor 25 for a predetermined period of time depending on the length of cable to be slitted, splayed, tripped and sheared. A suitable motor control circuit 49 is of conventional design that counts the revolutions of the motor which can be translated into inches selected by operating selector switch 50 and indicated by indicia means 51 as shown in FIG. 1. After the cable has been fed into the machine the selected number of inches, control circuit 49 causes motor 25 to stop its feeding operation by means of actuation of a magnetic clutch (not shown) or the like whereupon air cylinder 26 is actuated via a relay-actuated valve (not shown) causing air to enter the cylinder thereby driving carriage C through its stripping and shearing operations and returning the carriage to its normal position adjacent the slitting and splaying area. After the slitted, splayed, stripped and sheared ribbon cable as illustrated in FIG. 9 is removed from the machine by unlatching the movable unit and moving plates 13 and 14 away from plates 11 and 12.

As can be discerned, the present machine includes a slitting and splaying area for slitting the splaying insulated electrical conductors of a ribbon cable and an insulation stripping and conductor shearing area for stripping insulation from ends of the conductors and shearing them to a desired length.

A rotatable disc 52 is pivotally mounted on front plate 4 and it has slots 53 therein of different widths to accommodate ribbon cables having two, four, six, eight and 10 insulated electrical conductors. A suitable positioning means such as, for example, a ball detent in the shaft carrying disc 52 to mate with indentations in the shaft opening, positions slots 53 centrally relative to the entrance to grooves 20 so that the cables can be properly slit, splayed, stripped and sheared.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A machine for slitting, splaying and stripping electrical cable means having a plurality of side-by-side insulated electrical conductors secured together comprising:
   frame means;
   slitting means provided by said frame means;
   splaying means provided by said frame means, said slitting means and said splaying means being in alignment;
   feed means on said frame means forward of said slitting and splaying means, said feed means adapted to feed said cable means into said slitting and splaying means with said slitting means slitting an end of the cable means to separate the ends of the insulated electrical conductors from each other and said splaying means spacing the slitted free ends of the insulated electrical conductors from each other as said cable means is fed therealong;
   stripping means provided by said frame means in alignment with said slitting and splaying means; and
   operating means provided for said stripping means for operating said stripping means for stripping insulation from the separated free ends of the insulated electrical conductors.

2. A machine according to claim 1 wherein said feed means includes means to operate said feed means for a limited period of time to feed a predetermined length of cable means into said machine.

3. A machine according to claim 1 wherein said stripping means includes a carriage means having movable and stationary stripping and shearing members, said operating means including means for actuating said movable stripping and shearing members.

4. A machine according to claim 25 wherein guide means are disposed adjacent said stripping and shearing member for guiding the separated electrical conductors during the stripping and shearing operations thereon.

5. A machine according to claim 3 wherein said operating means includes driving means connected to said carriage means for driving said carriage means along the separated insulated electrical conductors so that said movable stripping and shearing members engage said actuating means.

6. A machine according to claim 5 wherein said operating means includes carrying means having cam means thereon.

7. A machine according to claim 1 wherein said slitting and splaying means comprise stacked block members having opposed groove means defining first channel means having parallel grooves and second channel means having grooves directed outwardly from a central axis of said block members separated by spacers having sharp edges spaced inwardly from rear ends of said block members.

8. A machine for slitting, splaying, stripping and shearing electrical cable means having a plurality of side-by-side insulated electrical conductors secured together comprising:
   frame means;
   feed means disposed on said frame means;
   slitting means provided by said frame means and disposed adjacent said feed means for slitting an end of the cable means to separate the ends of the insulated electrical conductors from each other;
   splaying means in alignment with said slitting means in said frame means for spacing the slitted free ends of the insulated electrical conductors from each other;
   stripping means in alignment with said splaying eans in said frame means for stripping insulation from ends of the free ends of the insulated electrical conductors;
   shearing means adjacent said stripping means in said frame means for shearing the free ends of the insulated electrical conductors to provide the insulated electrical conductors with predetermined lengths;
   operating means connected to said feed means for operating same to thereby feed the electrical cable means into and along said slitting and splaying means for slitting and splaying the insulated electrical, conductors thereby; and
   further operating means connected to said stripping and shearing means for operating same to strip insulation from the free ends of the insulated electrical conductors and to shear the free ends to predetermined lengths.

9. A machine according to claim 6 wherein said carrying means and said cam means inlcude means to enable said cam means to be disposed at selected positions along said carrying means to provide stripped electrical conductors of varying lengths.

10. A machine according to claim 9 wherein said cam means have first sections for moving said movable stripping members to a stripping position and second sections for moving said movable stripping members to a shearing position when said movable stripping members engage first and second sections.

* * * * *

UNITED STATES PATENT OFFICE
CERTIFICATE OF CORRECTION

Patent No. 3,782,227  Dated July 6, 1971

Inventor(s) CORNELIS TEUNIS VEENENDAAL

It is certified that error appears in the above-identified patent and that said Letters Patent are hereby corrected as shown below:

Col. 3, line 21, after "openings" insert --respectively disposed opposite the triangular-shaped openings--

Col. 3, line 53, after "driven" insert --away--

Col. 4, line 53, change "tripped" to --stripped--

Col. 4, line 61, change "26" to --36--

Col. 5, line 4, change "the" to --and--

Claim 4, line 1, change "25" to --3--

Claim 5, line 1, change "3" to --4--

Signed and sealed this 8th day of October 1974.

(SEAL)
Attest:

McCOY M. GIBSON JR.
Attesting Officer

C. MARSHALL DANN
Commissioner of Patents